United States Patent [19]

Kitamura

[11] Patent Number: 4,922,148

[45] Date of Patent: May 1, 1990

[54] WATER-COOLED ALTERNATOR FOR VEHICLE

[75] Inventor: Yutaka Kitamura, Hyogo, Japan

[73] Assignee: Mitsubishi Denki Kabushiki Kaisha, Tokyo, Japan

[21] Appl. No.: 341,593

[22] Filed: Apr. 21, 1989

[30] Foreign Application Priority Data

Apr. 25, 1988 [JP] Japan ................. 63-101725

[51] Int. Cl.5 .................. H02K 5/24; F16F 15/22
[52] U.S. Cl. ................. 310/68 D; 123/41.31; 310/54; 310/89
[58] Field of Search ........... 123/41.31; 310/54, 58, 310/68 D, 89, 91

[56] References Cited

U.S. PATENT DOCUMENTS 4,262,224  4/1981  Kofink ........................... 310/54
4,739,204  4/1988  Kitamura et al. ............ 310/68 D
4,818,906  4/1989  Kitamura et al. ............ 310/68 D
4,849,665  7/1989  Kitamura et al. ............ 310/68 D

FOREIGN PATENT DOCUMENTS 189942  8/1987  Japan ........................... 310/54

Primary Examiner—Peter S. Wong
Assistant Examiner—D. L. Rebsch
Attorney, Agent, or Firm—Sughrue, Mion, Zinn, Macpeak & Seas

[57] ABSTRACT

A portion of a rear bracket an alternator for engine is in direct contact with an engine block, and a coolant passage for connecting a passage of the rear bracket and the engine cooling system is liquid-tightly formed through this, replacing the prior art inlet and outlet hose, removed, resulting in minimization of pressure loss of engine coolant, increase of flow rate of coolant and improved cooling.

1 Claim, 3 Drawing Sheets

WATER-COOLED ALTERNATOR FOR VEHICLE

BACKGROUND OF THE INVENTION

The present invention relates to an alternator to be driven by an engine of a vehicle such as automobile and, particularly, to an improvement of a cooling system thereof.

FIG. 3 is a cross section of a conventional alternator for vehicle, which is disclosed in Japanese Patent Application Laid-Open No. 178137/1987. In the figure, a reference numeral 1 depicts a rotary shaft on which a pulley 2 is fixedly mounted. A rotor 3 includes a magnetic core 4 having a boss portion fixedly mounted on the rotary shaft 1, which has a plurality of magnetic pole pieces 4a arranged peripherally with fixed space, a support ring 5 of non-magnetic material, which is fixedly attached to an inner periphery of the pole pieces 4a and another magnetic core 6 fixedly attached to the support ring, which has a plurality of magnetic pole pieces 6a arranged peripherally with fixed space and alternatingly with the pole pieces 4a.

An exciter core 7 is fixedly arranged around an outer peripheral portion of the boss portion of the core 4 and an inner peripheral portion of the core 6 with air gaps therebetween. An exciting coil 8 is supported by the core 7. A stator core 9 supports a stator coil 10 in slots thereof.

A front bracket 11 supports rotatably the rotary shaft 1 through a bearing 14 and supports fixedly the stator core 9. The front bracket 11 has an inlet hole 11a for conducting cooling air thereinto and an outlet hole 11b for discharging it after heat exchange.

A rear bracket 12 is connected tightly through an O-ring 18 to the front bracket 11 by bolts (not shown) for fixedly supporting the exciting core 7 and rotatably the rotary shaft 1 through a bearing 15.

A rear end portion of the stator coil 10 is covered liquid-tightly by an enclosure 16 of thermally conductive metal material. A space between the metal enclosure 16 and the stator coil 10 is filled with insulating filler 17. The enclosure 16 is fixedly attached liquid-tightly to the stator core 9 and has a cylindrical protrusion 16a fitted in an annular groove 12a provided in the rear bracket 12 and the liquid-tight sealing is provided by a gasket 19 of a viscose material of silicon group which is provided in the groove.

A coolant inlet tube 13 and a coolant outlet tube (not shown) are provided on the rear bracket 12, to which an inlet hose 13a and a outlet hose are liquid-tightly connected, respectively. An annular passage 23a is formed between an inner peripheral portion of the rear bracket 12 and an outer peripheral portion of the enclosure 16, through which liquid coolant supplied from the inlet tube 13 flows in an arrow direction and is discharged from the outlet tube.

A cooling cover 20 of thermally conductive metal material is liquid-tightly mounted on the rear bracket 12. A branch passage 23b for liquid coolant is defined between the rear bracket and the cooling cover. Liquid coolant from the inlet tube 13 is branched at a branch hole 12c of the rear bracket 12 and branched coolant flows therethrough and, at a return hole (not shown) of the rear bracket 12, joined to a discharge side of the passage 23a and discharged through the outlet tube.

A rectifier 21 for converting a.c. current corresponding to a.c. voltage induced in the stator coil 10 into d.c. current and a voltage regulator 22 are fixedly mounted on the cooling cover 20 through heat sinks 21a and 22a, respectively. The voltage regulator 22 responds to an output voltage of the alternator to control an exciting current to thereby regulate a terminal voltage to a predetermined value. A protective cover 24 is mounted on the rear bracket 12 for providing a mechanical protection to the electric elements.

A fan 25 mounted on the magnetic core 4 of the rotor 3 is to supply cooling air mentioned previously.

A cooling effect of the conventional generator mentioned above is as follows. When the rotary shaft 1 is rotated by the vehicle engine through belt means, the fan 25 is rotated to flow cooling air to the front end portion of the stator coil 10 and the stator core 9 to thereby cooling them.

On the other hand, a portion of low temperature liquid engine coolant flows from the inlet hose 13a through the inlet tube 13 and the passage 23a and cools the rear end portion of the stator coil 10 by heat exchange between the latter and liquid coolant. Further, by heat exchange of coolant flowing that the branch passage 23b, the exciting coil 8, the bearing 15, the rectifier 21 and the voltage regulator 22 are cooled indirectly through the core 7 and, then coolant is returned through the discharge tube and the discharge hose to the engine cooling system.

In the conventional alternator mentioned above, in order to direct the portion of the engine coolant to the passage 23a of the alternator, the inlet hose 13a and the outlet hose must be arranged between the engine and the inlet tube 13 and the outlet tube of the alternator, respectively. Due to the fact that protruded portions such as the inlet tube 13 and the outlet tube must be provided on the outer periphery of the rear bracket of the alternator, a problem arises that they interfere other auxiliary devices of the engine or an engine block itself, so that it is difficult in view of layout of an engine room to mount the alternator on the engine.

SUMMARY OF THE INVENTION

The present invention was made to solve such problem and an object is to provide an alternator for vehicle in which piping means for liquid coolant is simplified and which can be mounted within a small mounting space in an engine room.

According to the present invention, a coolant passage formed in a rear bracket of an alternator is directly connected to a coolant system of the engine so that engine coolant can be supplied directly to the coolant passage of the alternator and returned to the engine without using an inlet hose and an outlet hose.

In an alternator for vehicle, according to the present invention, a portion of a rear bracket is made in direct contact with an engine block and a coolant passage is liquid-tightly constituted for connecting a passage formed in the rear bracket to a coolant circulating system of the engine through the direct contact portion.

In the present invention, it is possible to remove an inlet hose and an outlet hose, resulting in that a piping flows easily and a mounting space is minimized. Further, there is no coolant pressure loss due to the inlet and the outlet hoses, resulting in that the flow amount of coolant is increased and the cooling is improved.

DETAILED DESCRIPTION OF THE PREFERRED EMBODIMENT

Figure 1:
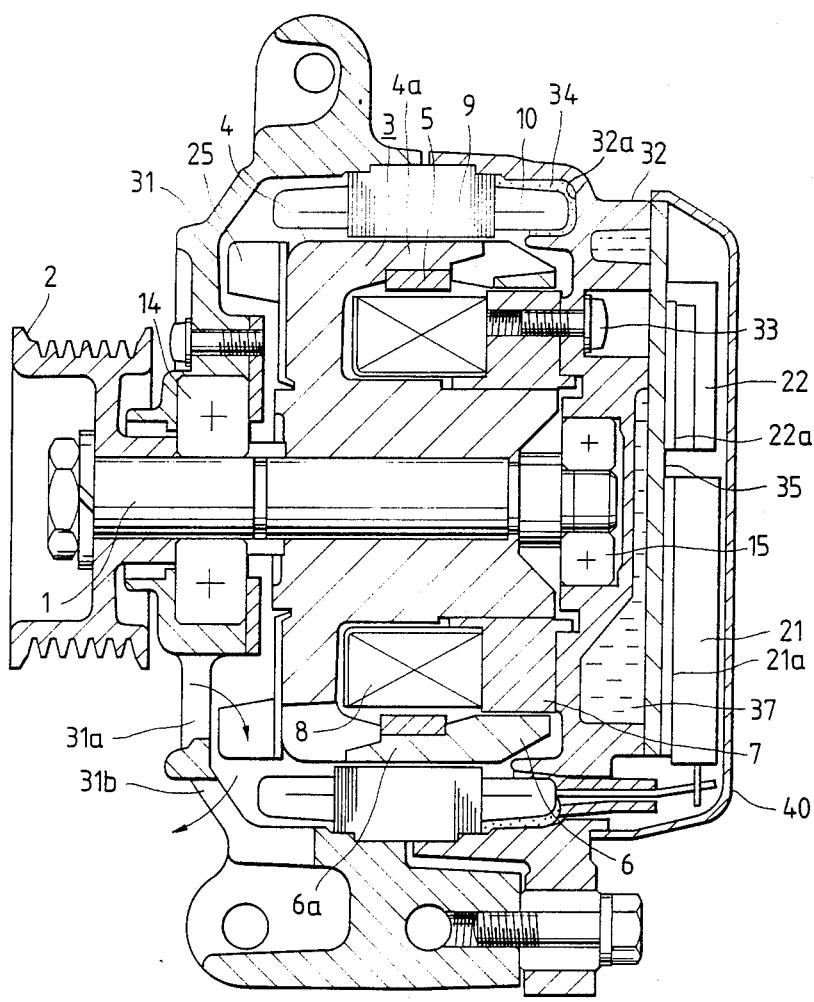
FIG. 1 is a longitudinal cross section of an alternator for vehicles according to the present invention.
Figure 2:
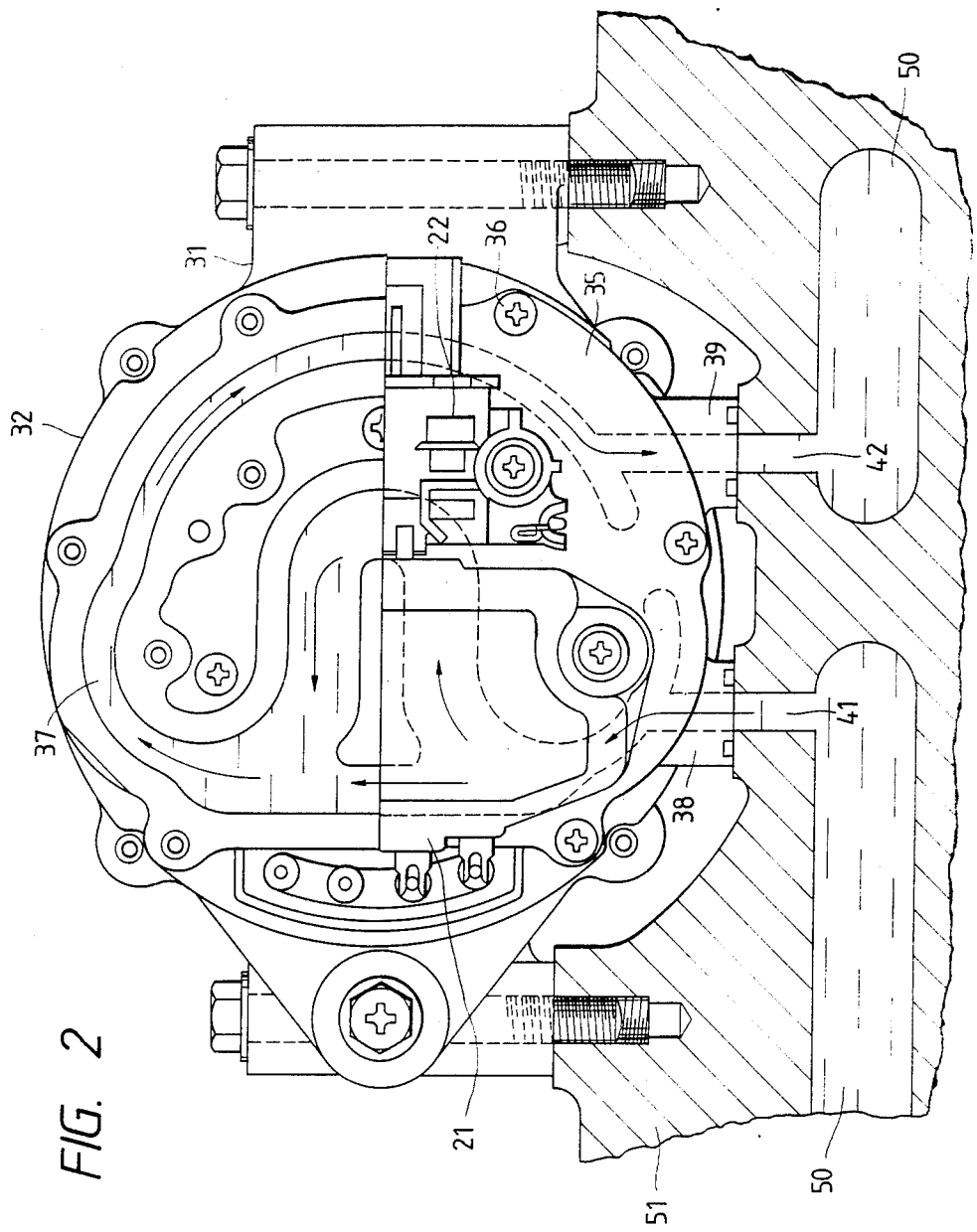
FIG. 2 is an end view of the alternator in FIG. 1 with a protective cover removed and a cooling cover being particularly removed.
Figure 3:
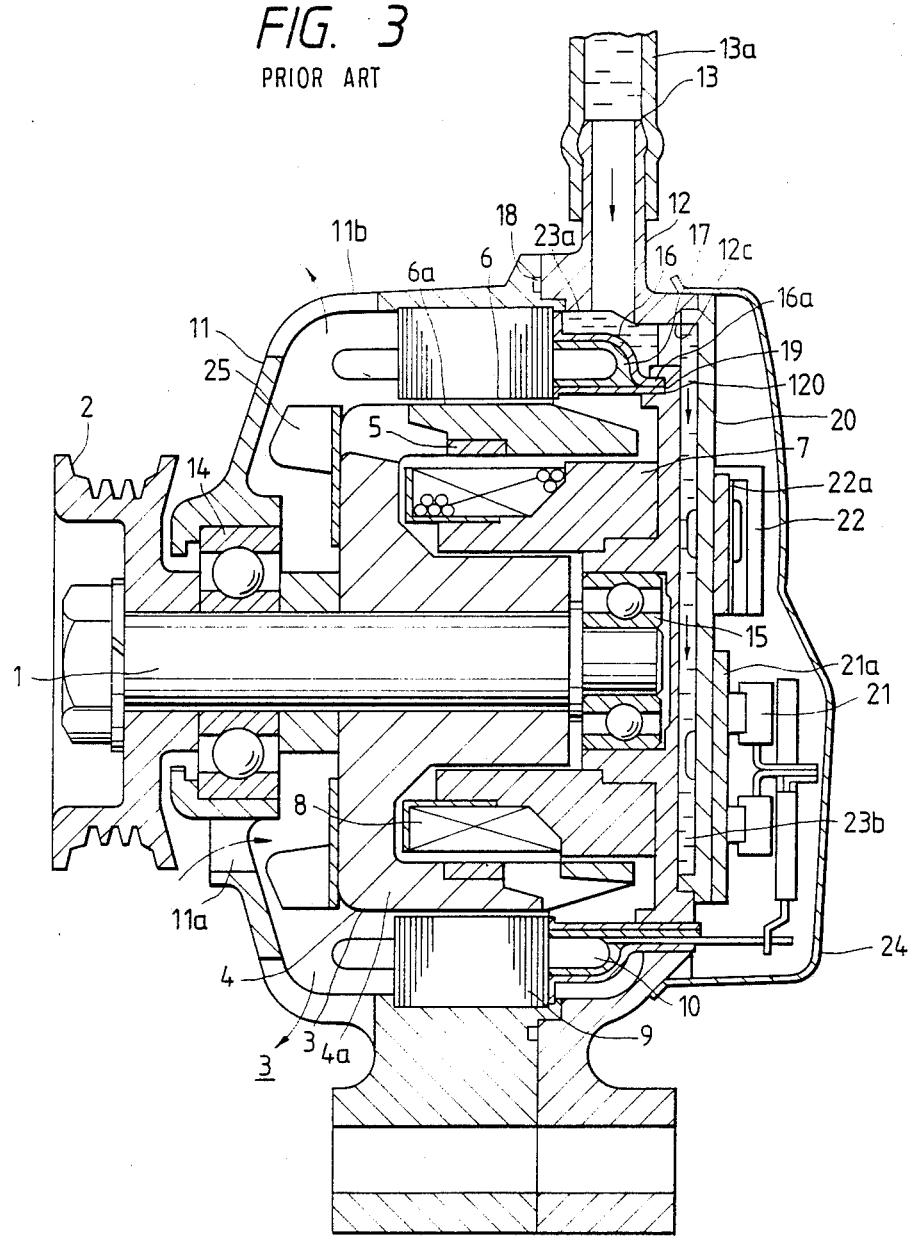
FIG. 3 is a longitudinal cross section of a conventional alternator.

FIG. 1 is a longitudinal cross section of an embodiment of an alternator for vehicles according to the present invention and FIG. 2 is an end view of the same with a protective cover being removed and a cooling cover being particularly removed, in which reference numerals 1 to 10, 14, 15, 21, 22, 25, 4a, 6a, 21a, and 22a are the same or corresponding portions of the above mentioned conventional alternator shown in FIG. 3.

In FIGS. 1 and 2, a front bracket 31 is supports a rotary shaft 1 through a bearing 14 and also supports fixedly a stator core 9. The front bracket 31 is formed with a cooling air inlet hole 31a and an outlet hole 31b. A rear bracket 32 is connected to the front bracket 31 by bolts (not shown) and supports the rotary shaft 1 rotatably through a bearing 15 and an exciter core 7 fixedly by bolts 33. An annular groove 32a is formed inside the rear bracket 32 for surrounding a rear end portion of a stator coil 10. Insulating filler 34 of thermally conductive material (e.g., mixture of silicon and alumina powder) fills a gap between the rear end portion of the coil and the groove.

A cooling cover 35 of thermally conductive metal is liquid-tightly mounted, by bolts 36, on an outer end of the rear bracket 32. The liquid-tight sealing is provided by providing a packing or sealing paint (not shown) between mating planes thereof.

A coolant inlet tube 38 and an outlet tube 39 are formed integrally with the rear bracket 32, which are connected liquid-tightly to an inlet passage 41 and an outlet passage 42 of a liquid coolant circulating system 50 of an engine through sealing members such as packings or O-rings, respectively.

A coolant passage 37 is formed between an outer end portion of the bracket 32 and the cooling cover 35, one end of which is connected to the inlet tube 38 and the other end of which is connected to the outlet tube 39.

A cooling operation of the alternator according to the mentioned embodiment is as follows. When the rotary shaft 1 is rotated by the vehicle engine through belt means, the front end portion of the stator coil 10 and the stator core 9 are cooled by cooling air supplied by a fan 25.

On the other hand, a portion of low temperature liquid coolant from the engine coolant circulating system 50 is branched at the inlet passage 41 and coolant entered from the passage 41 directly into the inlet tube 38 flows as shown by arrows to cool the rear bracket 32 and the cooling cover 35, and then is returned from the outlet tube 39 through the outlet passage 42 to the engine cooling system 50.

Therefore, in the side of the rear bracket 32, the stator coil 10 is cooled through the filler 34 and the exciter coil 8 and the bearing 15 are cooled through the exciting core 7. In the side of the cooling cover 35, the rectifier 21 and the voltage regulator 22 are cooled.

As mentioned above, according to the present invention, in which a portion of a rear bracket is in direct contact with an engine block and a coolant passage for connecting a passage of the rear bracket and the engine cooling system is liquid-tightly formed through this contact portion, an inlet hose and an outlet hose can be removed, making circulation easier and mounting space smaller. Further, liquid coolant pressure loss due to the inlet and the outlet hoses is removed, increasing flow rate of coolant and improving cooling.

What is claimed is:

1. An alternator for a vehicle, comprising a rotor magnetic core fixedly secured to a rotary shaft and adapted to be magnetized by an exciting coil, a stator core surrounding said rotor magnetic core and having a stator coil mounted thereon, a front bracket supporting a bearing and a rear bracket supporting a bearing, said front and said rear bracket supporting said stator core and said rotary shaft through said respective bearings, a fan mounted on a front end portion of said magnetic core, for supplying cooling air into said front bracket, a rectifier and a voltage regulator, a cooling cover mounted liquid-tightly on a rear end of said rear bracket and having an outer surface on which said rectifier and said voltage regulator are mounted and a coolant passage provided between said rear end portion of said rear bracket and said cooling cover for circulating liquid coolant supplied from outside of said alternator, a portion of said rear bracket being in direct contact with an engine block, and a passage liquid-tightly constituted for communicating said coolant passage of said rear bracket with a coolant circulation system of an engine through said direct contact portion.

* * * * *